March 14, 1950
E. R. WILLIAMS
2,500,304
SYSTEM FOR MAINTAINING LIQUID LEVEL
AND GAS PRESSURE IN RECEPTACLES
Filed Aug. 24, 1945
2 Sheets—Sheet 1
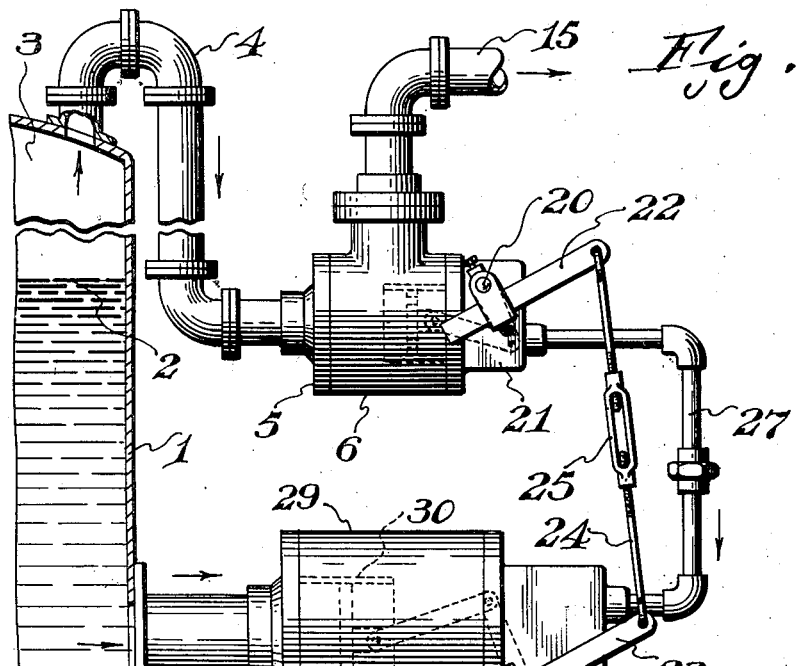
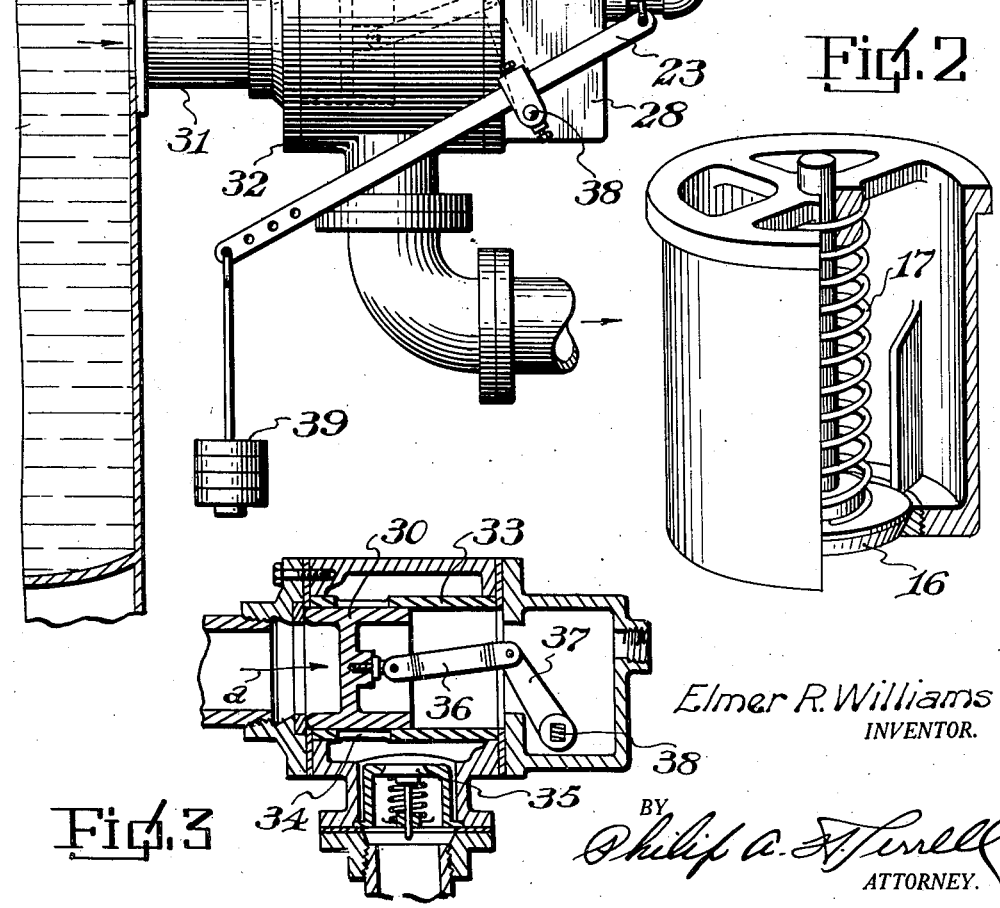
Elmer R. Williams
INVENTOR.
BY
Philip A. Terrell
ATTORNEY.

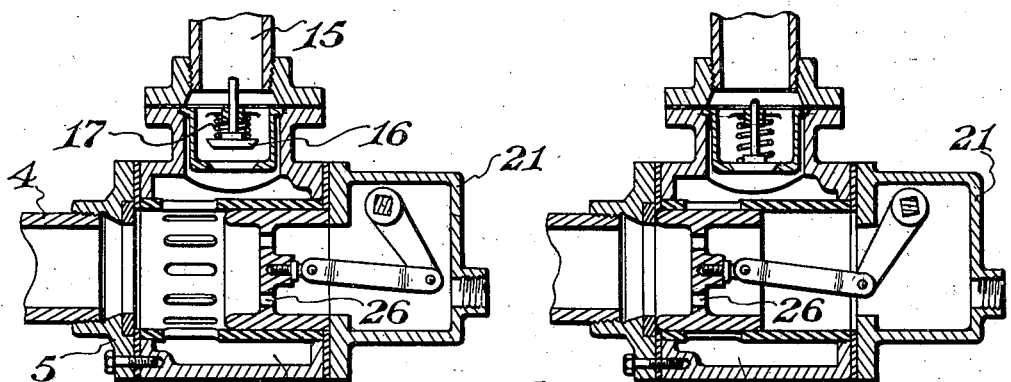
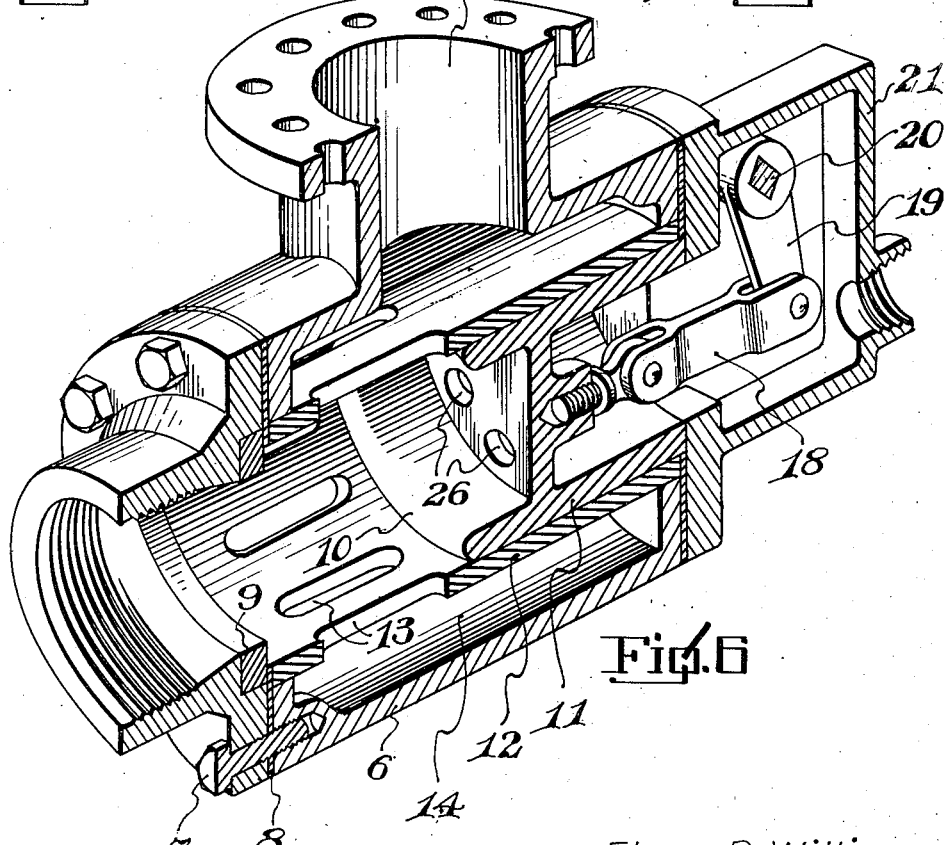
Elmer R. Williams
INVENTOR.
ATTORNEY.

Patented Mar. 14, 1950

2,500,304

UNITED STATES PATENT OFFICE 2,500,304

SYSTEM FOR MAINTAINING LIQUID LEVEL AND GAS PRESSURE IN RECEPTACLES

Elmer R. Williams, Tulsa, Okla., assignor to Forrest Lee Murdock, Sr., Tulsa, Okla.

Application August 24, 1945, Serial No. 612,486

4 Claims. (Cl. 183—2.7)

1

The invention relates to systems for maintaining a predetermined liquid level and gas pressure in receptacles, particularly oil and gas separators, and has for its object to provide a system wherein excess gas pressure is automatically relieved from the receptacle, and the liquid above a predetermined level is automatically discharged from the receptacle, and the discharge of gas pressure stopped during a liquid discharge operation.

A further object is to provide a liquid level maintaining device and gas pressure relief device, in connection with an oil and gas separator including a piston gas pressure control valve and a weighted liquid level control valve, and by-pass means through the gas control piston to the rear of the liquid level control piston for counteracting the gas pressure on the liquid column in the separator, and mushroom valves having a margin of differential for discharging excess gas pressure, above a predetermined amount, and excess liquid, above a predetermined amount, when the liquid control piston is unseated.

A further object is to provide a variable weighted lever in connection with the liquid level control piston and the gas control piston for normally maintaining the liquid level piston in closed position and the gas control piston in open position, thereby allowing excess pressure of gas to be discharged from the receptacle.

The weighted lever normally maintains the liquid level within the receptacle.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a side elevation of the control device, showing the same applied to a conventional gas and oil separator.

Figure 2 is a perspective view of one of the mushroom valves.

Figure 3 is a sectional view through the oil piston and mushroom valve.

Figure 4 is a vertical longitudinal sectional view through the gas relief piston and mushroom valve, showing the mushroom valve open for discharging excess gas pressure.

Figure 5 is a view similar to Figure 4 showing the gas controlled piston closed so that the gas pressure, above the oil, will be added to the columnar pressure of the oil during an oil discharge operation.

Figure 6 is a detail perspective view in longitudinal section of the gas controlled valve and casing with the mushroom valve eliminated.

Referring to the drawings, the numeral 1 designates a conventional form of separator in which a predetermined liquid level 2 is maintained, and a predetermined gas pressure at 3, above the liquid, in the separator. Usually fifteen pounds pressure is maintained. This gas pressure varies from time to time and the liquid level fluctuates during the oil and gas separating operation. It is desirable to maintain a substantial liquid level and pressure in the separator at all times.

Extending upwardly and downwardly from the upper end of the separator is a gas pressure discharge line 4, which line terminates in a flange 5 connected to a piston casing 6 by bolts 7. A packing 8 is interposed between the parts. Flange 5 is also provided with a resilient seat 9, against which seat the rounded end 10 of the gas control piston 11 seats, during a liquid discharging operation. The piston 11 slides longitudinally in a ported sleeve 12, through the ports 13 of which sleeve gas flows to the annular chamber 14 around the sleeve and is discharged through the pipe 15 by the unseating of the mushroom valve 16. Mushroom valve 16 acts against a spring 17, consequently the excess gas pressure above the liquid is discharged, however there is, preferably, a five pound strength in favor of the spring 17.

Gas piston 11 is provided with a link connection 18 to a lever 19 carried by the shaft 20 in the rear housing 21, which housing is bolted on the outer end of the casing 6. Secured to the outer end of the shaft 20, adjustably, is a lever 22, which lever is connected to a weight lever 23 by a rod 24, having a turnbuckle 25 therein so the leverage can be varied as desired.

All of the above mechanism controls the gas pressure, however the gas pressure extends through the ports 26 and through by-pass pipe 27 to the chamber of the rear casing 28 of the liquid control piston casing 29, to the rear of the liquid control piston 30 for balancing the gas pressure against the liquid pressure so the gas pressure will not be added to the columnar pressure on the liquid piston 30; the purpose of which will presently appear.

Connected to the separator 1 is a liquid discharge pipe 31, which pipe is connected to a flange 32 of the liquid piston casing 29. The liquid piston 30 is slidably mounted in a ported sleeve 33, but it will be noted that there are not any ports in the piston 30, however when the liquid level in the separator rises above a predetermined amount it exerts a pressure against the piston 30 in the direction of the arrow $a$ and then liquid is discharged through the ports 34 and through the spring-actuated mushroom valve 35, which mushroom valve preferably has a differential of five pounds in its favor against the columnar pressure of the fluid and the gas in the separator above the liquid. Piston 30 has a link connection 36 with a lever arm 37 carried by a transverse shaft 38, and mounted on the outer end of the shaft 38 is the weight lever 23, one end of which lever is connected to the adjustable connecting rod 24. The other end of the weight lever 23 is provided with a weight 39, of sufficient weight to maintain liquid piston 30 closed against the columnar pressure within the separator, and at the same time maintain the gas piston in open position as shown in Figure 3. With the parts in this position the excess pressure within the upper end of the separator will, from time to time, be discharged by the unseating of the mushroom valve 16, however it will be noted that some of this pressure and gas will be by-passed through ports 26, by-pass pipe 27 and to the rear of the liquid piston 30, thereby counteracting the downward pressure of the gas above the liquid.

When the liquid level rises in the separator above the level controlled by the weight 29 the liquid piston 30 moves rearwardly, and the gas piston 11 is moved to closed position as shown in Figure 5, thereby cutting off the discharge of gas and allowing the gas pressure to be exerted downwardly on the liquid column for the liquid discharging operation and adding the additional pressure for overcoming the differential in favor of the mushroom valve 35. When the liquid level has been re-established the weight 39 will again move the liquid piston 30 to closed position and will return the gas piston 11 to open position as shown in Figure 3, so that the mushroom valve 16 can again resume its normal operation of relieving gas pressure. It will be noted that gas piston 11 is always open except during a liquid discharging operation, and that both pistons are purely control pistons, and the mushroom valves are primarily the discharge valves for both the gas and oil at predetermined pressures.

From the above it will be seen that a system is provided for intermittently discharging gas and liquid from a receptacle and maintaining a predetermined gas pressure within the receptacle as well as a predetermined liquid level.

The invention having been set forth what is claimed as new and useful is:

1. The combination with an oil and gas separator tank, of means for maintaining a predetermined gas pressure above a liquid column in the tank and maintaining a predetermined liquid level in the tank, said means comprising a gas relief valve casing in communication with the tank chamber above the liquid level, a gas relief valve in said gas valve casing, a liquid relief valve casing in communication with the liquid body within the tank, a liquid relief valve in said liquid valve casing, a gas operated piston slidably mounted in the gas relief valve casing and normally open, a liquid relief piston slidably mounted in the liquid relief valve casing and normally closed, weighted lever means connecting the gas relief piston and the liquid relief piston and normally maintaining gas piston open and said liquid piston closed during normal operation and forming means whereby the liquid piston will be moved to open position upon excessive columnar pressure and the gas piston will be closed, until the liquid columnar pressure is relieved, and means whereby gas pressure above the liquid will by-pass through the gas piston into the oil casing and add its pressure to the outside of the oil piston acting against the liquid columnar pressure in the tank.

2. A device as set forth in claim 1 wherein the gas and oil pistons are slidably mounted in ported sleeves discharging to the gas and oil relief valves.

3. A device as set forth in claim 1 including an adjustable link in the weighted leverage connection between the pistons.

4. A device as set forth in claim 1 wherein the gas and oil relief valves are provided with a differential of pressure actuation in their favor.

ELMER R. WILLIAMS.

REFERENCES CITED

The following references are of record in the file of this patent:

UNITED STATES PATENTS

| Number | Name | Date |
|---|---|---|
| 1,620,096 | Harris | Mar. 8, 1927 |
| 1,941,030 | Williams | Dec. 26, 1933 |
| 1,997,879 | Watry | Apr. 16, 1935 |